United States Patent [19]

Krutchen et al.

[11] Patent Number: 4,579,878

[45] Date of Patent: Apr. 1, 1986

[54] POLYMER FOAM, THERMOFORMED SHAPED THEREOF AND METHODS OF FORMING SAME

[75] Inventors: Charles M. Krutchen, Pittsford; Wen-Pao Wu, Victor, both of N.Y.

[73] Assignee: Mobil Oil Company, New York, N.Y.

[21] Appl. No.: 669,984

[22] Filed: Nov. 9, 1984

Related U.S. Application Data

[63] Continuation of Ser. No. 560,641, Dec. 12, 1983, Pat. No. 4,535,100.

[51] Int. Cl.$^4$ ................................................. C08J 9/22
[52] U.S. Cl. ..................... 521/180; 264/53; 264/321; 521/56; 521/59; 521/60; 521/79; 521/81; 521/98; 521/918
[58] Field of Search ........... 521/180, 918, 79, 81, 521/98, 56, 60; 264/321, 53

[56] References Cited

U.S. PATENT DOCUMENTS

| | | | |
|---|---|---|---|
| 2,525,965 | 10/1950 | Smith | 521/918 |
| 2,899,708 | 8/1959 | Donaldson et al. | 521/918 |
| 3,277,029 | 10/1966 | Chadwick et al. | 521/180 |
| 3,290,261 | 12/1966 | Goldblum | 521/180 |
| 3,442,829 | 5/1969 | Moore et al. | 521/180 |
| 3,738,963 | 6/1973 | Praetorius et al. | 521/189 |
| 3,819,545 | 6/1974 | Hunter | 521/180 |
| 3,844,876 | 10/1974 | Wilson et al. | 521/918 |
| 3,903,224 | 9/1975 | Billiu | 521/180 |
| 3,950,484 | 4/1976 | Elgi | 521/180 |
| 4,032,309 | 6/1977 | Selemme | 521/180 |
| 4,065,401 | 12/1977 | Cohnen | 521/180 |
| 4,097,425 | 6/1978 | Niznik | 521/180 |
| 4,241,114 | 12/1980 | Gagliani | 521/918 |

*Primary Examiner*—Morton Foelak
*Attorney, Agent, or Firm*—Alexander J. McKillop; Michael G. Gilman; James P. O'Sullivan

[57] ABSTRACT

A foam structure having a density of less than about 20 lbs/ft$^3$. The method of forming the same comprising forming a homogeneous melt blend under pressure of a polymer member selected from the group consisting of polyetherimide resin particles, polycarbonate resin particles, a polymer blend of polyphenylene oxide and polystyrene in particle form imbibed with a blowing agent, followed by extrusion of the same into a lower pressure atmosphere. A composition comprising said particles imbibed with methylene chloride, chloroform, 1,1,2-trichloroethane or mixtures thereof. A method of thermoforming said foam in sheet form.

3 Claims, No Drawings

POLYMER FOAM, THERMOFORMED SHAPED THEREOF AND METHODS OF FORMING SAME

This is a continuation of copending application Ser. No. 560,641, filed on Dec. 12, 1983, now U.S. Pat. No. 4,535,100.

The present invention relates to a polymer foam, thermoformed shapes thereof and methods of preparing the same.

Aircraft and other structures employ foamed polymers for insulation and structural purposes. The electrical industry employs foamed polymers for electrical insulation. It is essential that foams of these types be comparatively resistant to heat. The art is ever on the alert for a foam which is fire resistant and which gives off low levels of smoke or toxic fumes as it is heated to degradation temperatures.

One aspect of the present invention relates to a novel foam structure which is highly heat resistant and which has inherent flame resistance with low smoke evolution. In another aspect, the present invention relates to a method of preparing such foams. In yet another aspect the present invention relates to thermoformed shapes of such foams.

SUMMARY OF THE INVENTION

The present invention relates to a polymer in foam form having a density of less than about 20 lbs/ft$^3$, wherein said polymer is selected from the group consisting of a solvent imbibable polyetherimide, polycarbonate and a blend of polyphenylene oxide and polystyrene, wherein said solvent is a member selected from the group consisting of methylene chloride, chloroform, 1,1,2-trichloroethane and mixtures thereof.

The preferred polyetherimides imbibable with said solvent are those within the following chemical structure:

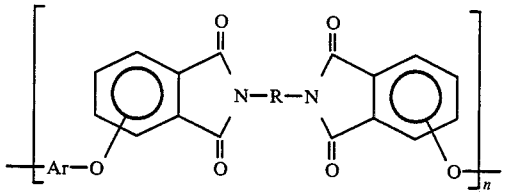

wherein Ar is a divalent organic radical containing from 6-20 carbon atoms, R is a bivalent radical selected from the group consisting of aliphatic, cycloaliphatic, aromatic and araliphatic, and n is a integer having a value greater than 1, for instance 2, 3, 4 or greater.

The preferred polycarbonates imbibable with said solvent have the following chemical structure

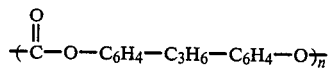

see Text Book of Polymer Science, 2nd Edition, Fred W. Billmeyer, Jr., 1971, Wiley-Interscience, N.Y., N.Y., page 456, the disclosure of which is incorporated herein by reference. Suitable commercially available polycarbonates are the LEXAN ® polycarbonates from General Electric Company.

The preferred thermoplastic blends of polyphenylene oxide and polystyrene are blends of poly 2,6-dimethyl-1,4-phenylene oxide and a high impact polystyrene.

The blend can be in a 20 to 80 weight percent ratio of either component. The term "high impact polystyrene" as used herein is intended to be generic to both the high impact polystyrene and the high impact copolymers derived from the isomeric methyl ethenyl benzenes mixtures and rubbery backbone polymers disclosed in U.S. Pat. No. 4,284,733, the disclosure of which is in its entirety incorporated herein by reference.

The present invention also relates to a composition comprising discrete particles of a polymer imbibed with a solvent member selected from the group consisting of methylene chloride, chloroform, 1,1,2-trichloroethane and mixtures thereof and wherein said polymer is a member selected from the group consisting of a polyetherimide, a polycarbonate and a polymer blend of polyphenylene oxide and polystyrene, said imbibed particles being in at least substantially free flowable form, said solvents being present in a quantity sufficient to foam said resin to a density less than 20 lbs/ft$^3$.

In a preferred form the foam of the present invention has a density of less than about 5 lbs/ft$^3$.

The present invention further relates to a process of preparing a low density foam structure of the above-identified polymers comprising:
  (a) providing said polymer in particle form imbibed with the above-identified solvent.
  (b) homogeneously melt blending said particles and solvent in an extrusion system under pressure;
  (c) extruding said melt blend into a lower pressure atmosphere to cause said solvent to vaporize yielding a foam structure.

During said process, the melt blend homogenizing can occur at a significantly lower temperature because of the presence of the imbibed solvent in the resin particles. If the resin and solvent are separately combined during processing, temperatures of 200° F. or higher could be required for reasonable processing rates and then a separate cooling step would have to be introduced into the process and system.

The present invention also relates to a method of preparing a thermoformed structure of the subject foam comprising:
  (a) subjecting a sheet of the polymer foam having a density of less than about 20 lbs/ft$^3$ to a first temperature sufficient to permit deformation thereof;
  (b) effecting a shape in said sheet while at said temperature; and
  (c) reducing the temperature of said sheet to a second temperature permitting permanent retention of said shape at or below said second temperature.

DETAILED DESCRIPTION OF THE INVENTION

The invention will be illustrated mainly with reference to the polyetherimides.

Polyetherimides of the type contemplated by the present invention have been known for some time but their preparation in foam form such that they have a density of less than about 20 lbs. per cubic foot are believed to be hitherto unknown. The contemplated polyetherimides are those which can be foamed according to the present process by means which comprise the use of a solvent member selected from the group consisting of methylene chloride, chloroform, 1,1,2-trichlorethane and mixtures thereof. U.S. Pat. Nos.

3,787,364 and 4,024,110, the disclosures of which are in their entirety incorporated herein by reference, disclose polyetherimides which can be solvent imbibed and foamed according to the present process. Preferred polyetherimides are those having the chemical structure shown above.

Polymers within the scope of this structure can be prepared by procedures outlined in the article by D. M. White et al entitled "Polyetherimides Via Nitro-Displacement Polymerization . . . ", etc. Journal of Polymer Science: Polymer Chemistry Edition, Vol. 19, 1635-1658 (1981), copyright 1981, John Wiley and Sons, Inc. Particular reference is made to the preparation of polymer "(18 ip)", having a molecular weight (Mw) of about 21,000, on page 1653 thereof. The disclosure of this article is incorporated in its entirety herein by reference. A specific example of the preparation of another polyetherimide within the contemplation of the present invention is as follows:

EXAMPLE 1

A mixture containing 2.855 parts of 1,3-bis(4-phenoxyphthalimido) benzene, 1.180 parts of Bisphenol A, 0.081 part of o-phenylphenol sodium salt and 20 parts N-methylpyrrolidone is heated to reflux under nitrogen atmosphere. The heating is continued for one hour during which time an approximate total of 10 parts of liquid is distilled off. The reaction mixture is cooled and poured into about 300 parts of methanol which is stirred in a blender. A white polymer is precipitated. The polymer is filtered, washed and dried under vacuum. The polymer is a polyetherimide within the structure defined above, wherein the precursor of Ar is Bisphenol A and R is phenylene.

A commercially available polyetherimide resin which corresponds to the above recited chemical formula is Ultem ® 1000 available from General Electric Company, Plastics Operations, One Plastics Avenue, Pittsfield, MA. Ths material has a $T_g$ of 421° F. It is available in particle form having a size roughly 1/16-⅛ inch is diameter by 1/16-3/16 inch in length. The following table details certain characteristics of the resin.

TABLE

|  | ASTM TEST | UNITS | ULTEM 1000 |
|---|---|---|---|
| MECHANICAL | | | |
| Tensile strength, yield | D638 | psi | 15,200 |
| Tensile modulus, 1% secant | D638 | psi | 430,000 |
| Tensile elongation, yield | D638 | % | 7-8 |
| Tensile elongation, ultimate | D638 | % | 60 |
| Flexural strength | D790 | psi | 21,000 |
| Flexural modulus, tangent | D790 | psi | 480,000 |
| Compressive strength | D695 | psi | 20,300 |
| Compressive modulus | D695 | psi | 420,000 |
| Gardner impact | — | in-lb | 320 |
| Izod impact | D256 | | |
| notched (⅛") | | ft-lb/in | 1.0 |
| unnotched (⅛") | | ft-lb/in | 25 |
| Shear strength, ultimate | — | psi | 15,000 |
| Rockwell hardness | D785 | — | M109 |
| Taber abrasion (CS 17, 1 kg) | D1044 | mg wt. loss/ 1000 cycles | 10 |
| THERMAL | | | |
| Deflection temperature, unannealed | D648 | | |
| @ 264 psi (¼") | | °F. | 392 |
| @ 66 psi (¼") | | °F. | 410 |
| Vicat softening point, method B | D1525 | °F. | 426 |
| Continuous service temperature index (UL Bulletin 746B) | — | °F. | 338 |
| Coefficient of thermal expansion (0 to 300° F.), mold direction | D696 | in/in-°F. | $3.1 \times 10^{-5}$ |
| Thermal conductivity | C177 | Btu-in/h-ft²-°F. | 1.5 |
| FLAMMABILITY | | | |
| Oxygen index (0.060") | D2863 | % | 47 |
| Vertical burn (UL Bulletin 94) | — | — | V-O @ 0.025" 5V @ 0.075" |
| NBS smoke, flaming mode (0.060") | E662 | | |
| $D_5$ @ 4 min | | — | 0.7 |
| $D_{MAX}$ @ 20 min | | — | 30 |

In carrying out the present process, it is preferred to employ a polyetherimide that is anhydrous so as not to introduce the likelihood of forming acid components through the combination of $H_2O$ and the solvent. Any such acid products would be corrosive to the extrusion equipment and possibly degradative to the polyetherimide or its foam structure. Subjecting the Ultem ® 1000 particles to a temperature of approximatley 300° F. for a period of about 4 hours will assure at least the substantial absensce of $H_2O$ in the resin.

In preparing a homogeneous melt blend of the blowing agent and the polyetherimide, if the two materials are combined by bringing them together in the barrel of an extruder, as is done in the case of polystyrene and isopentane for example, high processing temperatures and additional cooling equipment would be necessary in order to extrude a polyetherimide foam. In such a case the processing temperatures would have to be in the range of from about 650°-700° F. and a separate high pressure control system would be necessary for the introduction of the above-defined blowing agent. Thereafter, a separate cooling means or zone would need to be employed in the system before extrusion could take place otherwise the formed system would collapse and an inferior foam structure would result.

In order to avoid this, it has been found that the polyetherimide particles can be readily impregnated with the above-identified class of blowing agents and the impregnated resin particles can be melt processed at a temperature below about 500° F. and as low as from about 425°-450° F. To impregnate the Ultem ® 1000 particles they merely need be subjected to a concentrated environment of the blowing agent vapors, for example, at room temperature for a period of up to about 48 hours. This will yield free flowing particles containing sufficient blowing agent to form a low density foam. The Ultem ® 1000 resin particles can contain up to about 30 parts of blowing agent per 100 parts of resin without any problem of inter particle adhesion. The particles are preferably impregnated with 3-20 parts of blowing agent per 100 parts by weight of resin. By employment of the blowing agent-impregnated Ultem ® 1000 particles this permits the use of significantly lower processing temperatures and simpler processing equipment since the blowing agent is already effectively dispersed throughout the resin matrix.

The following example illustrates the simplicity of the process.

EXAMPLE 2

Anhydrous Ultem ® 1000 particles were exposed to an environment of methylene chloride at room temperature for a period of approximately 48 hours to yield free flowing particles containing about 15 parts by weight methylene chloride per 100 parts of resin. These particles were fed into the feed throat of a single screw extruder having an L/D ratio of 24:1. The screw had a diameter of 1¼". The impregnated particles were homogeneously melt blended at a temperature of 450° F. and thereafter transported directly to the die area of the system. The homogeneous melt was extruded through a capillary die having a diameter of 0.080 inches and a L/D of 16.1. The extruded product had a density of approximately 2.5 lbs/ft$^3$ with a fine closed cell structure. It has been determined that during and within a short period (about 2 hours) after extrusion, the methylene chloride was virtually totally expelled from the foam cells to yield the excellent foam product. The foam resin retains all of the high flame resistant and low smoke generation characteristics of the virgin polymer.

As indicated above the employment of chloroform, 1,1,2-trichoroethane or mixtures thereof and with methylene chloride will result in an equivalent foam. It is to be understood that conventional additives, such as nucleating agents, may be added to the starting material or melt before extrusion.

The foam resins of the present invention can be thermoformed into any desired shape. Generally this involves preheating a sheet of the foam structure so as to gradually bring the temperature of the foam up to molding temperature and thereafter shaping the foam by means of either, a female mold assisted by some force to draw the softened foam into conformation with the mold, or by the use of matching male and female dies.

By way of example, a polyetherimide foam sheet of a density less than about 20 lbs/ft$^3$ can be formed employing the resin of Example 2 in the system described in Example 2, modified by the employment of a circular slit die which will yield a sheet of about 90 mils thickness. The foam sheet can be preheated to a temperature of about 475°-525° F. and incrementally advanced to male and female dies which will conform the resin sheet into a plurality of semi-circular sheaths two of which may accommodate the insulation of a conduit having an outside diameter of about 1 inch. After the structures are thermoformed in the foam sheet, the molds are cooled, the thermoformed sheet removed and the impressed structures are separated from the selvage of the sheet.

What is claimed:

1. A polymer in foam form having a density of less than about 10 lbs/ft$^3$ wherein said polymer is a solvent imbibable linear polycarbonate wherein said solvent is a member selected from the group consisting of methylene chloride, chloroform, 1,1,2-tricholoroethane and mixtures thereof.

2. The foam of claim 1 wherein the polycarbonate has the following chemical structure:

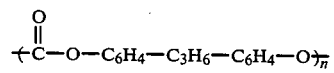

3. The polymer of claim 2 in foam form having a density of less than about 5 lbs/ft.$^3$.

* * * * *